United States Patent [19]

Finney

[11] 3,896,948

[45] July 29, 1975

[54] BOAT TRAILER ADJUSTABLE GUIDE STRUCTURE

[76] Inventor: Kelly D. Finney, Rt. 2, Box 531-A, Chico, Calif. 95926

[22] Filed: Oct. 26, 1973

[21] Appl. No.: 409,870

[52] U.S. Cl. .................................................. 214/84
[51] Int. Cl.² ........................................... P60P 1/00
[58] Field of Search .......................... 214/84; 193/35

[56] References Cited
UNITED STATES PATENTS

| | | | |
|---|---|---|---|
| 3,067,892 | 12/1962 | Barrett et al. | 214/84 X |
| 3,160,297 | 12/1964 | Stumvoll | 214/84 |
| 3,390,796 | 7/1968 | Theobald | 214/84 X |
| 3,788,502 | 1/1974 | Bell | 193/35 R |
| 3,812,988 | 5/1974 | Pyle | 214/84 |
| 3,837,509 | 9/1974 | Gladnick | 214/84 |

*Primary Examiner*—Allen N. Knowles
*Attorney, Agent, or Firm*—Flehr, Hohbach, Test, Albritton & Herbert

[57] ABSTRACT

A wheeled trailer for transporting a boat which includes improved adjustable guide structure adjacent the rear end thereof for guiding a boat relative to the trailer during loading and unloading. The trailer comprises a chassis having laterally spaced longitudinal frame members extending along opposite sides thereof. The guide structure is defined by two generally upright posts adjustably secured to associated frame members so that each post may be selectively positioned at any location along the longitudinal extent of a frame member. The lateral spacing of the posts relative to each other may be selectively varied to accommodate boat hulls of various widths therebetween. Each guide post is formed with a generally L-shaped lower end which is releasably secured to an associated frame member so that the posts are rotatable about the axes of their lower ends whereby the lateral spacing of the upper ends of the posts may be varied. Means also are provided to selectively incline the posts relative to the vertical so that boats having hulls of varying contours also may be accommodated.

7 Claims, 6 Drawing Figures

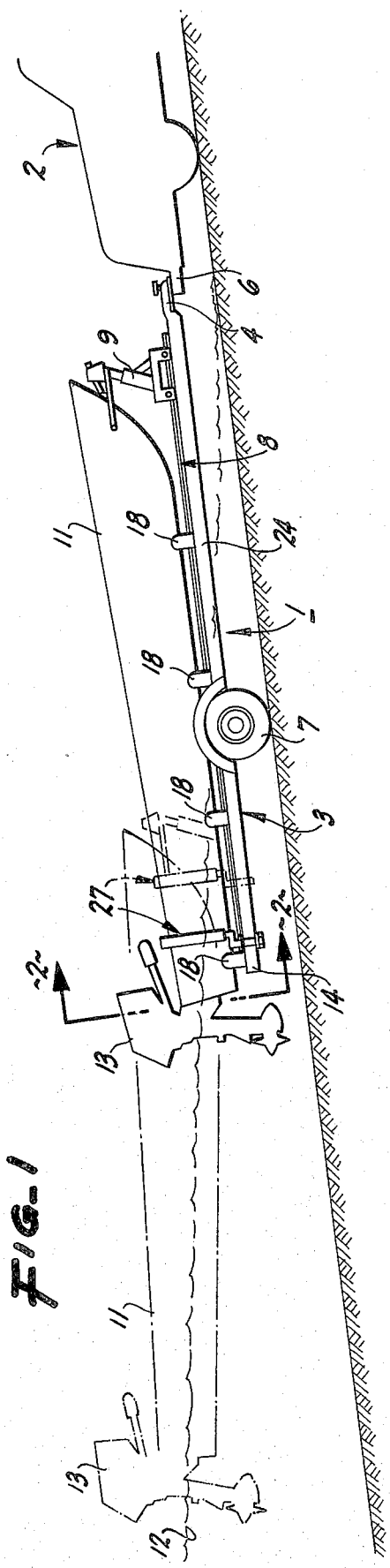
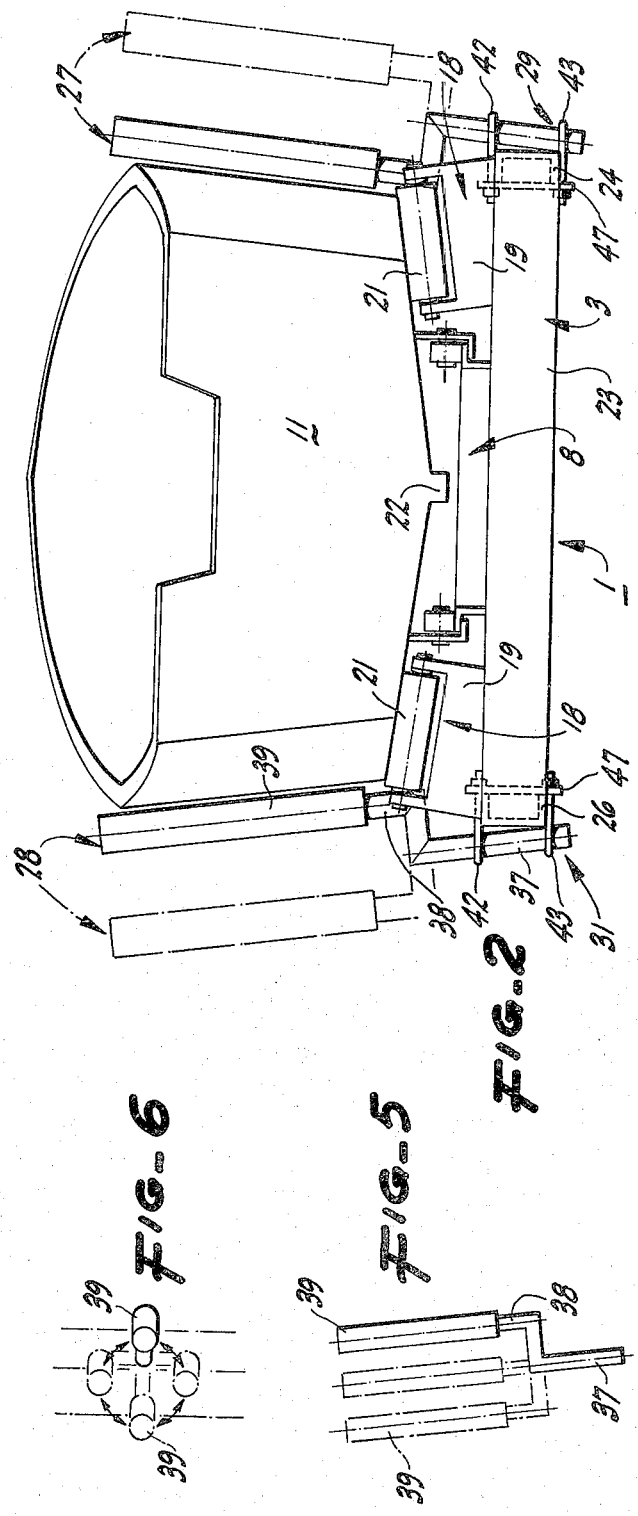

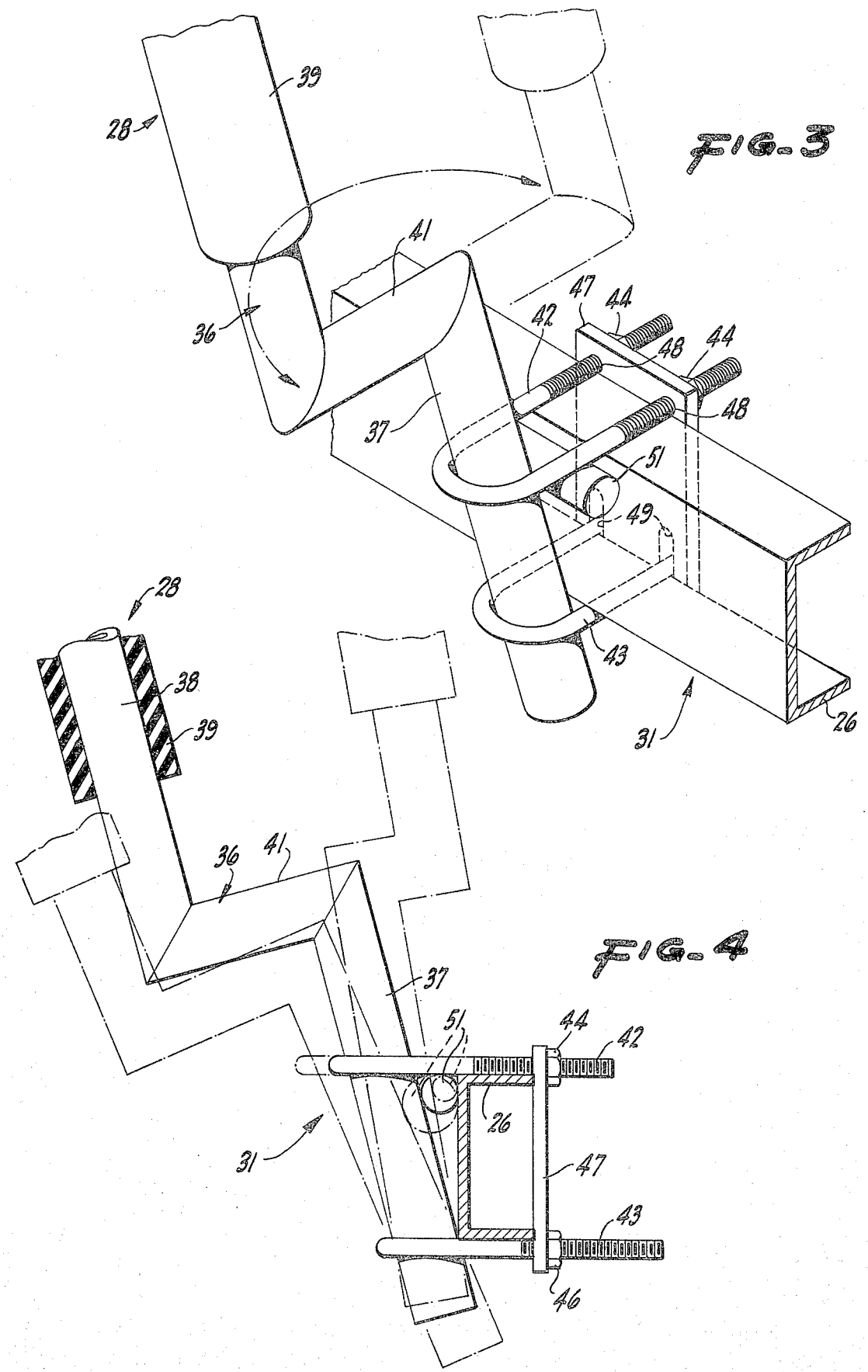

BOAT TRAILER ADJUSTABLE GUIDE STRUCTURE

BACKGROUND OF THE INVENTION

1. Field of the Invention

This invention relates to the field of trailers for transporting boats relative to a launching and loading site. More particularly, this invention relates to a boat trailer and to improved guide structure adjacent one end of the trailer for facilitating loading and unloading of a boat relative thereto.

Still more particularly, this invention relates to a boat trailer which includes selectively adjustable guide structure which adapts the trailer to accommodate boats of varying hull sizes and configurations upon selective adjustment of such guide structure.

This invention further relates to a boat trailer which includes selectively adjustable guide structure adjacent the rear end thereof which is defined by two laterally spaced guide posts, the spacing between which is selectively adjustable, and the vertical orientation of which is also selectively adjustable, so that the guide structure adapts the trailer to accommodate boats having hulls of varied widths and contours.

2. Description of the Prior Art adjacent commercially or

A wide variety of wheeled boat trailers designed to be towed behind a vehicle are commercially available. However, so far as is known, prior to the present invention, none of such trailers incorporated therein adjustable guide structure adjaent the rear end thereof to adapt the trailer to accommodate boats of varying sizes and contours. That is, so far as is known, boat trailers heretofore disclosed in the prior art or available commerically utilized and incorporated therein generally fixed guide structure which was not adjustable, as a result of which a given trailer was capable of handling only a single size ro type of boat thereon.

For example, in Finney U.S. Pat. No. 3,750,805 dated Aug. 7, 1973, an improved boat trailer is illustrated and described which has improved structural and functional characteristics over previously known trailers. However, in the trailer illustrated in said Finney Patent, the guide structure provided adjacent the rear end thereof is defined by generally rigid, fixed upstanding guide rods or posts which are secured in one position and which do not possess the adjustable capability characteristic of the present invention.

The guide structure of the present invention lends wide adjustment capability to the subject trailer so that the same may accommodate thereon boats of varying types, sizes and contours, as a result of which the subject trailer can satisfy a wider variety of needs than trailers heretofore known.

SUMMARY OF THE INVENTION

This invention relates generally to an improved boat trailer. More particularly, this invention relates to an improved guide structure incorporated into a wheeled boat trailer to adapt the same to accommodate boats of varying types, hull sizes and contours.

Still more particularly, this invention relates to an improved boat trailer and adjustable guide structure incorporated therein in which such guide structure is defined by a pair of selectively positionable guide posts releasably secured to longitudinal frame members of the trailer chassis. In that regard, each of such guide posts is mounted on an associated frame member by mounting structure which is adjustably positionable at any predetermined position along the length of an associated frame member so that the posts may be positioned in the most convenient place to guide a boat relative to the trailer during loading and unloading thereof.

Each guide post also is rotatably secured to its associated frame member so that the post may be selectively rotated about the longitudinal axis of its offset lower end which is operatively engaged with an associated frame member. Such offset lower end imparts eccentric rotational characteristics to such post so that an upper end of such post, with which a boat is to be engaged, may be moved selectively inwardly or outwardly relative to the frame member. As a result of such rotational adjustment capability, the guide structure posts may be positioned laterally closer to or farther away from each other, depending upon the width of the hull of the boat to be accommodated on the trailer.

Additionally, the mounting structure for each of the guide posts includes means for orienting the upper boat engaging end of each such post at a predetermined angle relative to the vertical so that boats having hulls of differing contours, i.e., hull taper angles, may be accommodated thereon.

By selectively positioning the guide posts at predetermined locations along the length of the frame members, and by spacing the upper ends of the guide posts at a predetermined distance from each other in the lateral direction, and by rotating each such post about the axis of its offset lower end, the desired spacial relationship between the opposed guide posts may be effected so that a boat of predetermined size and contour may most effectively be accommodated on the trailer.

Thus, it should be understood, that the guide posts of the subject invention which adapt the trailer to accommodate boats of varying sizes and contours are adjustable both laterally relative to each other, angularly relative to the vertical, and longitudinally relative to the trailer chassis.

From the foregoing it shoudl be understood that objects of this invention, include the provision of an improved boat trailer; the provision of an improved boat trailer which may accommodate thereon boats of varying types, sizes and shapes; the provision of an improved boat trailer which includes adjustable guide structure which adapts the trailer to accommodate boat hulls of varying types, sizes and contours; the provision of a boat trailer which includes adjustable guide structure defined by opposed guide posts which are adjustable both longitudinally of the trailer chassis, laterally relative to each other, and angularly relative to the vertical.

These and other objects of this invention will become evident from a study of the following description taken in conjunction with the appended drawings.

BRIEF DESCRIPTION OF THE DRAWINGS

FIG. 1 is a should elevational view of a boat trailer invention therein the improved guide structure of the present invention.

FIG. 2 is a rear elevational view, on an enlarged scale, of the subject trailer looking in the direction of line 2—2 of FIG. 1.

FIG. 3 is an isometric view of one part of the guide structure illustrating details of the components thereof.

FIG. 4 is an elevational view of one part of the guide structure illustrating various selective positions of adjustability thereof.

FIGS. 5 and 6 are generally schematic views of one part of the guide structure further illustrating various selective positions of adjustment thereof.

DESCRIPTION OF THE PREFERRED EMBODIMENT

The improved adjustable guide structure of the present invention, as described hereinafter, is utilizable with and incorporated into any known boat trailer construction which includes laterally spaced, longitudinally extending frame members in the chassis thereof. In the attached drawings, however, the subject improved guide structure is illustrated, by way of example only, in conjunction with the improved boat trailer of the type shown in Finney U.S. Pat. No. 3,750,805 dated Aug. 7, 1973. For a detailed description and understanding of the improved features of the trailer shown in said Finney patent, reference is directed to such patent. So far as the features of the trailer disclosed in that patent, which are important to the present invention, are concerned, such features are described hereinafter.

In that connection, an improved trailer incorporating the present invention, generally designated 1 in FIGS. 1 and 2, is towable to and from a boat launching site by any suitable vehicle, designated 2, such as a truck or automobile. The trailer includes a wheeled chassis, generally designated 3, incorporating any suitable box frame or like chassis construction therein. The chassis is defined by a series of longitudinal and transverse metal frame members secured together by welding, or other conventional means in known fashion, into a rigid chassis framework.

At the front end of the chassis, and secured thereto in known fashion, is a conventional trailer hitch structure 4 releasably interengageable with the bumper or frame 6 of the towing vehicle in known fashion. The chassis 3 is supported by two or more wheel and tire assemblies, each of which is generally designated 7, in known fashion.

The particular trailer illustrated includes track structure 8 extending longitudinally thereof from one end of the trailer to the other. Rideable on and supported by the track structure 8 is a movable dolly structure, generally designated 9, with which the boat to be transported by the trailer is operatively engageable as disclosed in detail in said Finney patent; reference is directed thereto for the mode of operation of and advantages produced by such dolly structure. The boat to be supported on the trailer and transported thereby is generally designated 11 and is designed to be loaded onto the trailer by utilizing the motive power of the boat in the manner described in said Finney patent. In the illustrated embodiment, the motive power of the boat is provided by a conventioanl outboard motor, generally designated 13.

It is during loading or unloading of the boat relative to a body of water, designated 12 in FIG. 1, that the guide structure of this invention serves its intended purpose. The guide structure is positioned adjacent the rear end of the trailer, designated 14, and facilitates loading and unloading of the boat relative to the trailer by guiding the boat into the proper position, or from the proper position, without damage thereto during the loading or unloading operation.

To assist in supporting the hull of the boat during movement thereof longitudinally of the trailer during loading and unloading, roller means, generally designated 18, are provided at spaced locations along opposite sides of the chassis of the trailer in known fashion. Such roller means protect the bottom of the hull of the boat during such movement and provide a support surface for the boat hull when the same is positioned on the trailer chassis.

The roller means illustrated includes a plurality of supporting brackets 19 positioned at spaced locations along opposite sides of the trailer, each having a conventional roller member 21 rotatably mounted thereon in known fashion. The respective rollers 21 are downwardly and inwardly inclined towards the longitudinal axis of the trailer as seen in FIG. 2 so that the same provide a supporting surface which conforms generally to the tapered contour of the bottom of the hull of the boat 11. Thus, the keel 22 of the boat is supported by the rollers 21 above the track structure 8 and above the chassis of the trailer.

As noted previously, the chassis 3 of the trailer is defined by a framework which includes a plurality of longitudinally spaced, laterally extending frame members, such as rear member 23 seen in FIG. 2 extending across the rear of the trailer. Additional similar transverse frame members are positioned at spaced locations along the length of the trailer. To complete the trailer framework, laterally spaced, longitudinally extending frame members, designated 24 and 26, are provided at opposite sides of the trailer as best seen in FIG. 2. Such laterally spaced frame members define the means by which the improved guide structure of the present invention is secured to the trailer chassis.

Such guide structure is provided in two opposed portions or parts, which are generally designated by reference numerals 27 and 28, at opposite sides of the trailer as best seen in FIG. 2. As shown in dotted and solid lines in FIG. 2, each part of the guide structure is adjustably secured to the chassis of the trailer, whereby the lateral spacing between such parts of the guide structure may be selectively varied so that boats having hulls of varying widths may be selectively accommodated therebetween. Also, as will be described hereinafter, each part of the guide structure is mounted for adjustable movement longitudinally of the chassis as illustrated by the dotted line showing of FIG. 1.

Furthermore, as will be described hereinafter, each part of such guide structure is mounted on the trailer chassis so that the angle of inclination thereof may be selectively varied between the vertical and a predetermined angle of inclination relative to the vertical, by means of which boats having hulls of varying types and contours may be accommodated on the trailer.

The guide structure further includes mounting means for adjustably securing each part thereof relative to the trailer chassis as will be described. The mounting means for the opposed parts of the guide structure are designated 29 and 31, respectively, in FIG. 2.

It should be understood that both parts 27 and 28 of the guide structure, and the mounting means 29 and 31 for such parts, are identical. Therefore, hereinafter reference is directed to only one part of the guide structure and its associated mounting means, designated by reference numerals 28 and 31, which appear at the left side of the rear end of the trailer when viewed in the direction of FIG. 2.

As noted previously, it is an important feature and advantage of this invention that each part of the guide structure is selectively positionable in a predetermined angle of inclination relative to the vertical. Such position may be varied from a fully upright or vertical position to an angle of 30° or more relative to the vertical, depending upon the hull contour of the boat to be supported. Additionally, each part of the guide structure is rotatable selectively through 360° to vary its lateral position relative to the opposed part of the guide structure. Also, each guide structure part is adjustable longitudinally along the length of the chassis as may be required to most effectively accommodate a boat therebetween.

Details of construction of the adjustable guide structure of the present invention are shown most clearly in FIGS. 3 and 4. In that regard, each part of the guide structure includes a generally upright guide post. The post illustrated in FIGS. 3 and 4 is designated 36 and is defined by a lower offset or eccentric end portion 37 and a generally straight upper portion 38. The upper portion is surrounded by a cylinder 39 of protective material, such as rubber, padded canvas, or carpeting material, to prevent marring of the hull of the boat engaged therewith.

It should be understood, as seen in FIG. 2, that it is the upper portion 38 of the guide post 36 which is selectively positioned to engage the side of the boat hull supported on the trailer. As best seen from FIG. 4, the preferred embodiment of guide post 36 has its lower and upper portions 37 and 38 extending generally parallel to each other, which results from the right angled relationship of an intermediate post portion 41 interposed therebetween and forming part of said lower L-shaped post portion. In that connection, the guide post preferably is formed in one integral piece by welding the three component sections thereof together as illustrated in FIG. 4.

The guide structure further includes means mounting each guide post to its associated frame member. That part of the guide structure shown in FIG. 3 includes mounting means 31 as set out hereinafter. Such mounting means secures the guide post adjustably and selectively at a predetermined location to the associated chassis frame member 26 which, in the embodiment illustrated, is defined by a metal channel member as best seen in FIGS. 3 and 4. The mounting means utilized in the preferred embodiment is defined by U-shaped fastening means secured to the frame member 26 in the manner to be described.

In that regard, such fastening means in the preferred embodiment comprises a pair of spaced U-bolts 42 and 43, having nut fasteners 44 and 46 threadedly engaged with the ends thereof. The lower end 37 of the guide post is positioned to extend through the bright portions of the U-bolts and such lower end is held in engagement with an outer surface of the frame member 26 and seen in FIG. 4.

Means for interconnecting the U-bolts to effectively hold the guide posts in a preselected position is defined by a mounting plate 47 which has a pair of holes 48 adjacent its upper edge to accommodate the ends of upper U-bolts 42 therethrough. A pair of elongated vertically extending slots 49, extending upwardly from adjacent the lower edge of plate 47, receive the bottom U-bolt 43 therethrough. The slots 49 adapt the mounting means to be positioned in engagement with frame members 26 of varying sizes.

By positioning the lower end 37 of the guide post through the vertically spaced bight portions of the U-bolts, and by tightening the nuts 44 and 46 against the inner surface of the mounting plate 47, the guide posts may be secured positively to the frame member 26 in the predetermined position selected therefor.

In that regard, it will be seen from FIGS. 2 and 3 that each guide post is rotatable within the bight portions of its associated U-bolts so that the position of the upper portion thereof relative to the frame member supporting the same may be selectively varied. As a result, the opposite guide posts of the guide structure may be positioned adjustably to be closer to or farther from each other to accommodate therein a boat of a particular width. It also should be understood, referring to FIG. 4, that each guide post may be moved vertically within the U-bolts to a preselected vertical orientation, also depending upon the configuration or size of the hull of the boat to be accommodated. In that regard, note the dotted line showing to the right of FIG. 4.

It further should be understood that the guide posts may be selectively positioned at any longitudinal location along the frame members associated therewith by loosening nut members 44 and 46 and sliding the plate members, U-bolts, and guide posts therewith to the predetermined position desired.

Finally, as noted previously, the guide structure of this invention includes means for altering the vertical angle of orientation of the guide posts between wide predetermined limits. For that purpose, the mounting means shown in FIG. 3 includes wedge means defined by a shim 51 interposed between the lower portion 37 of the guide post and the outer surface of the frame member 26. Such shim orients the axis of the lower portion of the post at a predetermined angle relative to the vertical and, accordingly, similarly orients the parallel upper portion 38 of the guide post a similar amount. As seen in FIG. 4, by changing the size of the shim 51 interposed between the frame member and the guide post, the angle of orientation relative to the vertical may be increased, or decreased, selectively.

It should further be understood that the shim does not in any way interfere with rotation of the guide posts about the axes of the lower eccentric portions thereof so that the lateral spacing of the opposed guide posts may be selectively varied as required to accommodate a boat of given size. By varying the angle of orientation and the lateral spacing of the guide posts relative to each other, boats of varying hull contours and sizes may be accommodated as previously noted.

In that regard, when a shim is not utilized, the lower portion of the guide post may be held flush with the outer surface of the frame member 26 so that the upper portion 38 thereof is in a truly vertical orientation. Thus, the guide post may be selectively positioned in any angular orientation relative to the vertical, from a fully upright position to an angle of 30° or more, depending upon the size of the shim interposed between the guide post lower end and the frame member 26.

When the guide post is rotated about the axis of its lower end 37, the same will generate a cylinder but its preselected angle of inclination relative to the vertical will not vary. In that regard, reference is directed to the schematic showing of FIGS. 5 and 6 which illustrate the various lateral positions which the upper portion of each guide post may take as the same is rotated about the axis of its lower end 37. The overall length of the guide posts may vary from approximately 2 to 8 feet, determined in accordance with the height and size of the boat hull to be accommodated by the trailer.

From the foregoing, it should be understood that the present invention relates to an improved guide structure for a boat trailer which adapts the same to accommodate boats of varying types, sizes and contours, including power boats, sail boats, tri-hull boats, ski boats and the like. Having thus made a full disclosure of this invention, reference is directed to the appended claims for the scope of protection to be afforded thereto.

I claim:

1. Adjustable guide structure for a boat trailer which includes a chassis having laterally spaced frame members extending longitudinally thereof, said guide structure comprising
   A. a pair of laterally spaced opposed generally upright guide posts positioned adjacent the rear end of said trailer, and
   B. means mounting each of said guide posts on an associated frame member, comprising
      1. mounting structure adjustably securing each said post to its associated frame member so that the lateral spacing of said posts relative to each other may be selectively varied in accordance with the width and contour of the hull of the boat to be carried on said trailer, said mounting structure comprising
         a. a mounting plate engaged with one side of said associated frame member,
         b. a pair of U-bolt and nut fasteners traversing said associated frame member and passing through said mounting plate,
         c. an end portion of said post being positioned through said U-bolts and held thereby against the opposite side of said frame member, and
         d. a shim member interposed between said side of said frame member and said post end whereby the axis of said post is inclined relative to the vertical.

2. Adjustable guide structure for a boat trailer which includes a chassis having laterally spaced frame members extending longitudinally thereof, said guide structure comprising
   A. a pair of laterally spaced opposed generally upright guide posts positioned adjacent the rear end of said trailer,
      1. each said post having a generally L-shaped lower end, and
   B. means mounting each of said guide posts on an associated frame member for selective adjustable rotation about the axis of said post lower end, comprising
      1. mounting structure defined by U-shaped fasteners secured to said associated frame member,
      2. said post lower end passing through said fasteners and being held against said associated frame member thereby,
      C. each said post being adjustably rotatable in said fasteners relative to its associated frame member so that the lateral spacing of said posts relative to each other may be selectively varied in accordance with the width of the hull of the boat to be carried on said trailer.

3. The guide structure of claim 2 in which said mounting means further includes
   3. a shim member interposed between said post lower end and said associated frame member,
   4. said shim causing the upper end of said post to extend at a predetermined angle of inclination relative to the vertical.

4. The guide structure of claim 2 in which said U-shaped fasteners adjustably secure said post to said associated frame member so that the orientation of such post relative to said trailer rear end may be selectively varied longitudinally along such frame member.

5. A boat trailer comprising
   A. a wheeled chassis having laterally spaced frame members extending longitudinally thereof, and
   B. guide structure adjacent the rear end of said trailer for guiding a boat into position thereon during loading, comprising
      1. a pair of laterally spaced opposed generally upright guide posts positioned adjacent the rear end of said trailer,
         a. each said post having a generally L-shaped lower end, and
      2. means mounting each of said guide posts on an associated frame member for selective adjustable rotation about the axis of said post lower end, comprising
         a. mounting structure defined by U-shaped fasteners secured to said associated frame member,
         b. said post lower end passing through said fasteners and being held against said associated frame member thereby,
      3. each said post being adjustably rotatable relative to its associated frame member so that the lateral spacing of said posts relative to each other may be selectively varied in accordance with the width of the hull of the boat to be carried on said trailer.

6. The guide structure of claim 5 in which said mounting means further includes
   3. a shim member interposed between said post lower end and said associated frame member,
   4. said shim causing the upper end of said post to extend at a predetermined angle of inclination relative to the vertical.

7. The guide structure of claim 5 in which said U-shaped fasteners adjustably secure said post to said associated frame member so that the orientation of such post relative to said trailer rear end may be selectively varied longitudinally along such frame member.

* * * * *